(12) United States Patent
Otterstedt et al.

(10) Patent No.: US 9,679,167 B2
(45) Date of Patent: Jun. 13, 2017

(54) CHIP AND METHOD FOR DETECTING AN ATTACK ON A CHIP

(71) Applicant: Infineon Technologies AG, Neubiberg (DE)

(72) Inventors: Jan Otterstedt, Unterhaching (DE); Thomas Kuenemund, Munich (DE)

(73) Assignee: Infineon Technologies AG, Neubiberg (DE)

( * ) Notice: Subject to any disclaimer, the term of this patent is extended or adjusted under 35 U.S.C. 154(b) by 182 days.

(21) Appl. No.: 14/080,847

(22) Filed: Nov. 15, 2013

(65) Prior Publication Data

US 2015/0143550 A1    May 21, 2015

(51) Int. Cl.
*G06F 21/00* (2013.01)
*G06F 21/87* (2013.01)

(52) U.S. Cl.
CPC .................................. *G06F 21/87* (2013.01)

(58) Field of Classification Search
CPC ................................. G06F 21/70; G06F 21/86
USPC .......................................................... 726/34
See application file for complete search history.

(56) References Cited

U.S. PATENT DOCUMENTS

| 5,117,457 | A | 5/1992 | Comerford et al. |
| 5,959,534 | A * | 9/1999 | Campbell et al. ......... 340/573.6 |
| 7,755,489 | B2 | 7/2010 | Georgescu et al. |
| 2012/0131673 | A1* | 5/2012 | Caci ............................... 726/23 |
| 2013/0044003 | A1* | 2/2013 | Eguro et al. .................. 340/653 |

OTHER PUBLICATIONS

Du et al., ZnO film thickness effect on surface acoustic wave modes and acoustic streaming, 2008, Applied Physics Letters.*

* cited by examiner

*Primary Examiner* — John B King
(74) *Attorney, Agent, or Firm* — Viering, Jentschura & Partner mbB

(57) ABSTRACT

According to one embodiment, a chip is described comprising a substrate; an energy source configured to provide energy to the substrate; an energy receiver configured to receive energy from the energy source via the substrate and a determiner configured to determine a value of a parameter of the energy transmission between the energy source and the energy receiver, to check whether the value matches a predetermined value of the parameter and to output a signal depending on the result of the check.

11 Claims, 4 Drawing Sheets

CHIP AND METHOD FOR DETECTING AN ATTACK ON A CHIP

TECHNICAL FIELD

The present disclosure relates to chips and methods for detecting an attack on a chip.

BACKGROUND

New types of attacks on security chips have become possible due to newly developed techniques that are used to thin down chips to allow access to the circuitry from the chip backside. Approaches such as shielding, which may be employed for protection of the front side of a chip, are typically not suitable for the protection of the backside of a chip or require special and costly processing steps.

Accordingly, efficient approaches that allow detection of backside attacks are desirable.

SUMMARY

According to one embodiment, a chip is provided including a substrate; an energy source configured to provide energy to the substrate; an energy receiver configured to receive energy from the energy source via the substrate and a determiner configured to determine a value of a parameter of the energy transmission between the energy source and the energy receiver, to check whether the value matches a predetermined value of the parameter and to output a signal depending on the result of the check.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
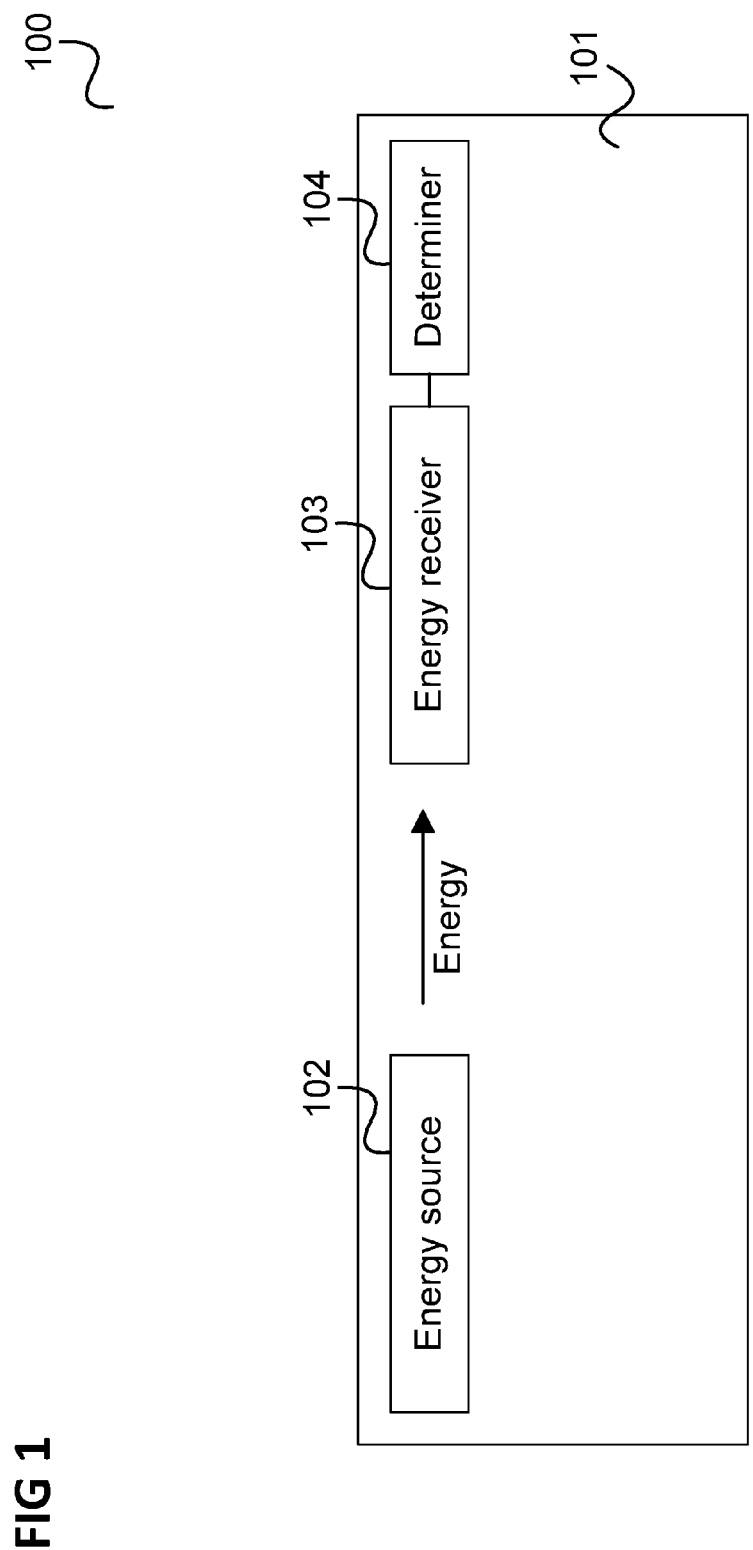
FIG. 1 shows a chip according to an embodiment.

FIG. 1 shows a chip 100 according to an embodiment.

The chip 100 includes a substrate 101, an energy source 102 configured to provide energy to the substrate and an energy receiver 103 configured to receive energy from the energy source via the substrate.

The chip 100 further includes a determiner 104 configured to determine a value of a parameter of the energy transmission between the energy source 102 and the energy receiver 103, to check whether the value matches a predetermined value of the parameter and to output a signal depending on the result of the check.

In other words, according to one embodiment, energy is guided through the substrate of a chip and the transmission behavior of the energy is compared to a reference behavior. If the transmission behavior has changed compared to the reference behavior determined earlier, this may be seen as an indication that an attacker has tampered with the chip, e.g. has thinned the substrate from the chip's backside. Accordingly, one or more components of the chip may prevent from functioning if a change of the transmission behavior (e.g. a change over a predetermined threshold) has been detected. For example, in case of a change of the transmission behavior the chip may be put in a permanent power on reset state.

It should be noted that, for example, configuration parameters of the energy source (i.e. the energy sender), may be adapted until the receiver receives energy from the sender as specified by a reference. The configuration parameters of the sender may then be checked and used as an indication whether an attacker has tampered with the chip. Accordingly, the signal output by the determiner may indicate to the sender whether the value of the parameter of the energy transmission between the energy source and the energy receiver matches the predetermined value of the parameter (i.e. whether energy is received as expected). In accordance with the signal, the configuration of the sender may be altered if necessary.

The energy source, the energy receiver and the determiner may be integrated in the chip.

It should be noted that the energy source and the energy receiver may be identical in the sense that they are implemented by a single structure (e.g. they share an antenna or even further circuitry).

The energy may for example be mechanical (acoustic) energy, thermal energy and electrical energy.

According to one embodiment, the energy source is an acoustic wave source configured to emit an acoustic wave via the substrate.

In this case, the parameter is a parameter of an acoustic wave received by the energy receiver.

For example, the parameter is a frequency, a phase or an amplitude of the acoustic wave received by the energy receiver.

The parameter for example specifies information about harmonics of the acoustic wave received by the energy receiver.

The parameter may also be a delay of the acoustic wave between the energy source and the energy receiver.

According to one embodiment, the energy source is a thermal source.

In this case, the parameter is for example the thermal resistance of the substrate.

According to one embodiment, the energy source is an electrical source.

The parameter is for example the electrical resistance of the substrate.

The parameter for example specifies whether energy provided by the energy source is received by the energy receiver.

The substrate is for example a silicon substrate.

According to one embodiment, the chip further includes a controller configured to allow the function of one or more components of the chip depending on the signal.

For example, the determiner is configured to output an alarm signal if the value does not match the predetermined value of the parameter and the controller is configured to prevent the function of one or more components of the chip in response to the alarm signal.

Checking whether the value matches a predetermined value of the parameter for example includes checking whether the value lies within a predetermined range of the predetermined value.

Figure 2:
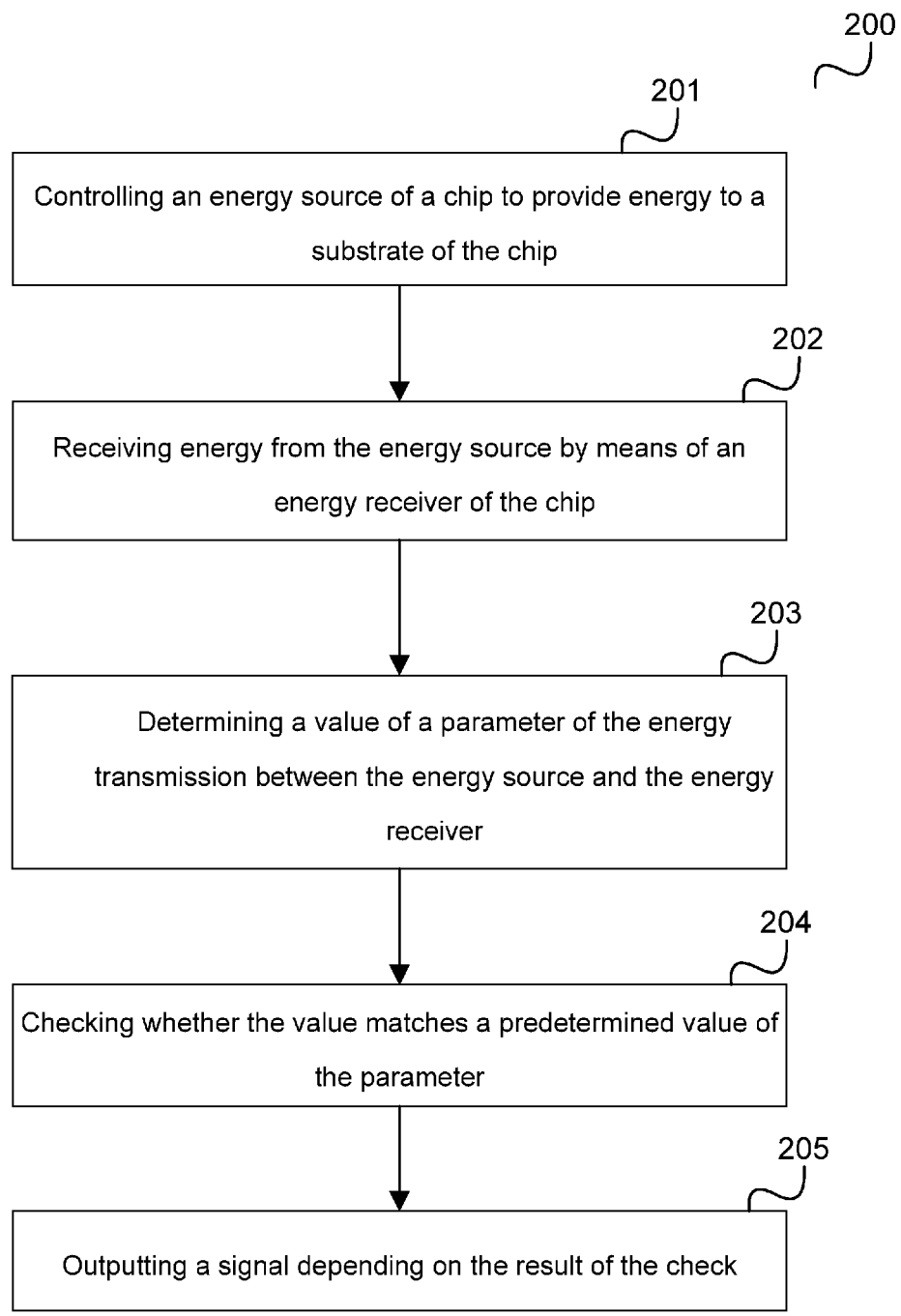
FIG. 2 shows a flow diagram according to an embodiment.

According to one embodiment, a method is performed as illustrated in FIG. 2.

FIG. 2 shows a flow diagram 200 according to an embodiment.

The flow diagram illustrates a method for detecting an attack on a chip.

In 201, an energy source of a chip is controlled to provide energy to a substrate of the chip.

In 202, energy is received from the energy source by means of an energy receiver of the chip.

In 203, a value of a parameter of the energy transmission between the energy source and the energy receiver is determined.

In 204, it is checked whether the value matches a predetermined value of the parameter.

In 205, a signal is output depending on the result of the check.

The method may further include determining the predetermined value by determining a value of the parameter of an earlier energy transmission between the energy source and the energy receiver.

For example, the method further includes storing the predetermined value in a memory of the chip.

It should be noted that embodiments described in context of the chip 100 are analogously valid for the method illustrated in FIG. 2 and vice versa.

In the following, an embodiment is described in more detail in which the energy is acoustic energy, i.e. an acoustic wave is fed into the substrate.

Thus, in the embodiment described in the following with reference to FIG. 3 changes of the mechanical properties of the chip as they may arise from a backside attack are directly detected by using acoustic waves instead of an indirect detection by means of an electrical parameter.

Figure 3:
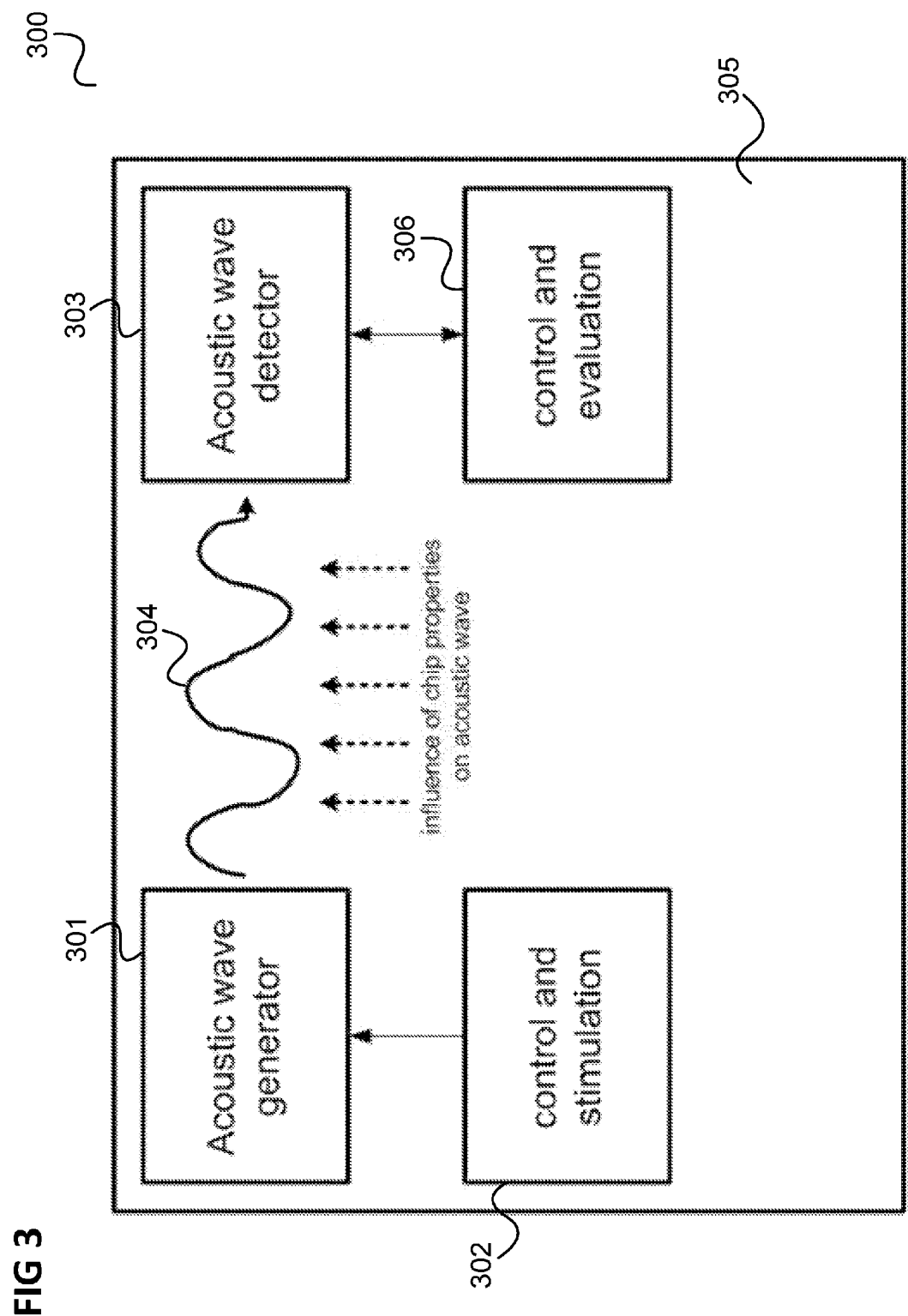
FIG. 3 shows a chip including a backside attack protection mechanism by means of acoustic waves.

FIG. 3 shows a chip 300 including a backside attack protection mechanism by means of acoustic waves.

The chip 300 includes an acoustic wave generator 301 which is configured to generate acoustic waves in accordance with the control by a control and stimulation circuit 302. The chip further includes an acoustic wave detector (or acoustic wave receiver) 303. An acoustic wave 304 generated by the acoustic wave generator 301 propagates via the chip's substrate 305 (e.g. at the surface of the substrate with a certain depth of penetration into the substrate), in other words the chip body, and is received by the acoustic wave detector 303. The properties of the chip such as thickness of the substrate 305 influence the transmission behavior of the acoustic wave. The acoustic wave detector may thus feed parameters describing the received wave to a control and evaluation circuit 306 which may evaluate whether the transmission behavior has changed with respect to a predetermined expected reference transmission behavior and may decide whether there has been an attack.

For example, when there has been no attack the detected acoustic wave has a set of properties (like frequency, phase, amplitude, delay, harmonics etc.) that are representative for the normal state of the chip, i.e. with unmodified thickness: This set of properties (or a subset of these properties) of the detected wave (which can be seen as a representation of the transmission behavior) is representing the good state. This good state may be learned and stored by the chip (e.g. by the control and evaluation circuit) in an enrollment phase. Alternatively, the generator and/or detector may be tuned to a desired reference state, and the tuning values are learned and stored.

The set of properties may be extended by collecting the reaction (i.e. the properties of the detected wave) for different generation modes, e.g. for different frequencies of the acoustic wave generated by the generator 301.

When the chip 300 is in operation (e.g. installed in an electronic device or on a chip card), the generator 301 may again generate an acoustic wave 304 and the control and evaluation circuit 306 may check the properties of the received acoustic wave with respect to the good state. This may for example be done after every reset of the chip 300, on a regular basis after a fixed time, continuously, or triggered by a special event or under software control. Only if the detected properties match the reference properties of the good state, the control and evaluation circuit 306 allows the chip to continue its normal operation. Otherwise, it triggers a suitable response such as the raising of an alarm plus ceasing of the chip's operation.

In the comparison, i.e. the checking whether detected properties match the reference properties suitable margins are employed to account for normal deviations (i.e. deviations occurring even without an attack) from the normal good state that are caused e.g. by temperature variations, voltage variations, or aging of the circuitry.

According to one embodiment, the acoustic wave generator 301 (or the energy source in the general case) may also be used as the acoustic wave detector 303 (or the energy receiver in the general case), e.g. by measuring as the transmission behavior the reflections of the acoustic wave on the chip structures, especially edges. For example, the acoustic wave generator 301 may determine properties of a returning wave that it has just sent out. In this case, acoustic wave generator 301 and acoustic wave detector 303 may make use of the same circuitry which allows saving chip area.

Further, according to one embodiment, any combination of multiple acoustic wave generators and/or multiple acoustic wave detectors may be used such that for example the transmission behavior along a plurality of transmission paths may be checked.

The acoustic wave generator 301 and/or the acoustic wave detector 302 may make use of the piezoelectric effect, which allows converting electric energy into mechanical (i.e. acoustic) energy and vice versa. For example, they may employ this effect in the way a surface acoustic wave (SAW) filter employs this effect and may be integrated into or mounted onto the chip.

Figure 4:
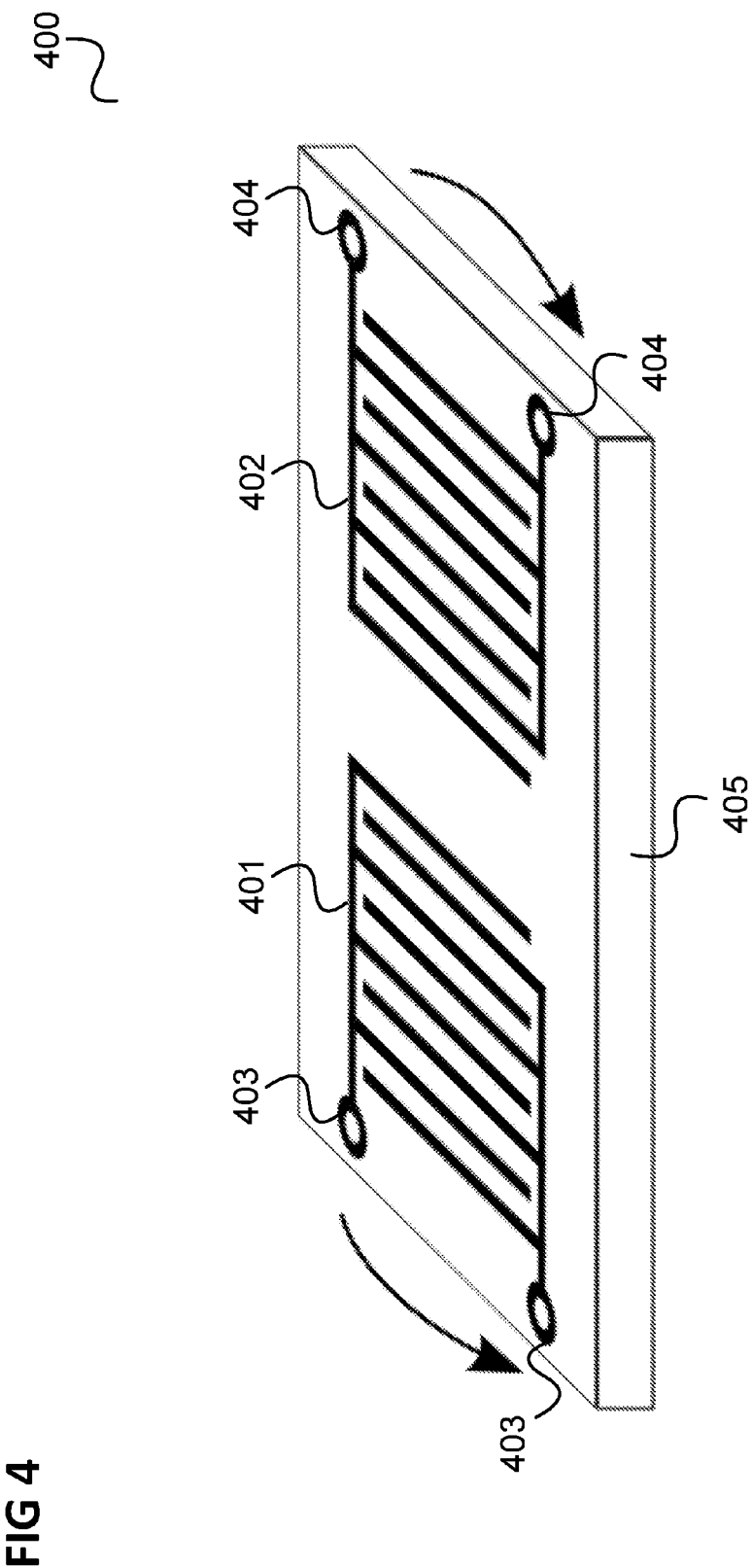
FIG. 4 shows an acoustic wave transmission arrangement according to an embodiment.

An implementation example is illustrated in FIG. 4.

FIG. 4 shows an acoustic wave transmission arrangement 400 according to an embodiment.

The arrangement 400 includes a first structure 401 for sending an acoustic wave and a second structure 402 for receiving an acoustic wave.

The first structure 401 receives an electric input signal corresponding to the acoustic wave to be transmitted via its terminals 403 and the second structure 402 provides an electric output signal corresponding to the received acoustic wave at its terminals 404.

The structures 401, 402 are arranged on a piezoelectric layer 405 which in turn is arranged on the substrate. For example, the structures 401, 402 may be arranged on a silicon oxide layer 405 which is arranged on the silicon substrate of a chip.

The acoustic wave generator 301 and the acoustic wave detector 303 and their placement on the chip may be selected in such a way that the mechanical properties of the chip (like its local or average thickness) have a strong influence on the generated wave, its transfer through the chip, and its detection in the detector.

The acoustic wave generator 301 and the acoustic wave detector 303 may also make use of micro mechanical structures, e.g. micro electrical mechanical systems (MEMS), to convert electric energy into mechanical (i.e. acoustic) energy and vice versa.

Apart from chip (substrate) thinning, the detection of a change of the transmission behavior of a energy transmission, may also allow detection that a chip is not mounted in its normal housing (module, package, . . . ) anymore. For example, even only demounting the chip will typically change the propagation of acoustic waves in the chip body. Thus, this approach allows detecting other attacks, which require the de-housing or re-housing of the chip.

The detection arrangement, i.e. the arrangement of energy source, energy receiver and determiner may further be configured to perform a self-check. For example, the energy receiver may be set to receiving no energy and it can be checked whether the determiner uses the correct parameter value (e.g. no energy received) such that it may be avoided that an attacker feeds wrong information to the checking.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A chip configured to detect tampering of the chip; wherein the chip comprises:
    a substrate;
    an energy transmitter configured to provide at least one acoustic wave to the substrate;
    an energy receiver configured to receive the at least one acoustic wave from the energy source via the substrate; and
    a circuit configured to:
        determine a value of a parameter for the at least one acoustic wave between the energy transmitter and the energy receiver, wherein the value of the parameter for the at least one acoustic wave indicates a thickness of the substrate,
        check whether the value of the parameter for the at least one acoustic wave lies within a predetermined range for the parameter, and
        prevent the chip from functioning when the value of the parameter for the at least one acoustic wave lies outside the predetermined range for the parameter therefor.

2. The chip according to claim 1, wherein the energy source is an acoustic wave source configured to emit an acoustic wave via the substrate.

3. The chip according to claim 1, wherein the parameter is a frequency, a phase or an amplitude of the acoustic wave received by the energy receiver.

4. The chip according to claim 1, wherein the parameter specifies information about harmonics of the acoustic wave received by the energy receiver.

5. The chip according to claim 1, wherein the parameter is a delay of the acoustic wave between the energy source and the energy receiver.

6. The chip according to claim 1, wherein the parameter specifies whether the at least one acoustic wave provided by the energy source is received by the energy receiver.

7. The chip according to claim 1, further comprising a controller configured to allow the function of one or more components of the chip depending on the signal.

8. The chip according to claim 7, wherein the circuit is configured to output an alarm signal if the value does not lie within the predetermined range for the parameter and the controller is configured to prevent the function of one or more components of the chip in response to the alarm signal.

9. A method for detecting tampering of a chip comprising:
    providing an energy transmitter of a chip to provide at least one acoustic wave to a substrate of the chip;
    receiving the at least one acoustic wave from the energy source by means of an energy receiver of the chip;
    determining a value of a parameter for the at least one acoustic wave between the energy transmitter and the energy receiver, wherein the value of the parameter for the at least one acoustic wave indicates a thickness of the substrate,
    checking whether the value of the parameter for the at least one acoustic wave lies within a predetermined range for the parameter therefor; and
    preventing the chip from functioning when the value of the at least one acoustic wave lies outside the predetermined range for the parameter.

10. The method of claim 9, further comprising determining the predetermined value by determining a value of the parameter of an earlier acoustic wave transmission between the energy source and the energy receiver.

11. The method of claim 10, further comprising storing the predetermined value in a memory of the chip.

* * * * *